Sept. 8, 1936.  G. TREMOLADA  2,053,541
BRAKE CONSTRUCTION FOR ROTARY DRAW WORKS
Filed Jan. 20, 1932  8 Sheets-Sheet 1

INVENTOR:
GUGLIELMO TREMOLADA,
BY
ATTORNEY.

Sept. 8, 1936.  G. TREMOLADA  2,053,541
BRAKE CONSTRUCTION FOR ROTARY DRAW WORKS
Filed Jan. 20, 1932  8 Sheets-Sheet 2

Fig. 2.

INVENTOR:
GUGLIELMO TREMOLADA,
BY

ATTORNEY.

Sept. 8, 1936.  G. TREMOLADA  2,053,541
BRAKE CONSTRUCTION FOR ROTARY DRAW WORKS
Filed Jan. 20, 1932  8 Sheets-Sheet 3

INVENTOR:
GUGLIELMO TREMOLADA,
ATTORNEY.

Fig. 8.

Sept. 8, 1936.  G. TREMOLADA  2,053,541
BRAKE CONSTRUCTION FOR ROTARY DRAW WORKS
Filed Jan. 20, 1932   8 Sheets—Sheet 6

INVENTOR:
GUGLIELMO TREMOLADA,
BY
ATTORNEY.

Sept. 8, 1936.　　　G. TREMOLADA　　　2,053,541
BRAKE CONSTRUCTION FOR ROTARY DRAW WORKS
Filed Jan. 20, 1932　　　8 Sheets-Sheet 7

Fig. 10.

INVENTOR:
GUGLIELMO TREMOLADA,
BY
ATTORNEY.

Sept. 8, 1936. G. TREMOLADA 2,053,541
BRAKE CONSTRUCTION FOR ROTARY DRAW WORKS
Filed Jan. 20, 1932 8 Sheets-Sheet 8

Fig. 12.

INVENTOR:
GUGLIELMO TREMOLADA,
BY

ATTORNEY.

Patented Sept. 8, 1936

2,053,541

UNITED STATES PATENT OFFICE 2,053,541

BRAKE CONSTRUCTION FOR ROTARY DRAW-WORKS

Guglielmo Tremolada, Los Angeles, Calif., assignor to Emsco Derrick & Equipment Company, Los Angeles, Calif., a corporation of California Application January 20, 1932, Serial No. 587,720

13 Claims. (Cl. 188—77)

My invention relates to the well drilling industry, and relates particularly to a draw-works apparatus which is employed in this industry, which draw-works apparatus has combined therein a novel brake construction having numerous features which will be pointed out in the following statement of the invention.

Before proceeding with the statement of the predominating characteristics of my invention, I shall first briefly refer to the relevant part of the well drilling industry in order that the objects and advantages of my invention, when enumerated, may be better understood.

In the drilling of an oil well it is common practice to employ what is known as a draw-works for handling the drill pipe and other apparatus which is lowered into the well. This draw-works is ordinarily positioned at one side of the derrick floor and includes a draw-works drum on which a hoisting cable is wound. Due to the fact that in the drilling of deep wells, which are now as deep as eight and ten thousand feet, the weight of the drill pipe is very great, it is necessary to provide the drum of the draw-works with very powerful braking elements so that the load may be properly handled and so that there will be absolutely no danger, in the operation of the draw-works, of the drum rotating out of control and causing great damage to be done.

My invention incorporates, in a draw-works which is particularly designed to receive my invention, a braking arrangement whereby ample braking power may be procured without the necessity of enlarging the size of the brake drums or without altering other well apparatus to accommodate the braking arrangement of my invention.

One of the important features of my invention resides in a braking construction which will be much safer than braking constructions which are ordinarily employed on draw-works. In the braking construction of my design I provide a means whereby all shock or "kick-back" will be absorbed by the braking apparatus itself and will not be transferred through the interconnected parts to the operating lever which is manually engaged by the driller. This feature of my invention may be best explained by pointing out that when it is desired to drive the drum which is being held stationary by reason of the brakes being applied, it is necessary to apply a driving force to the drum prior to the time that the brakes are released. If this practice were not followed, there would be a momentary tendency for the load to drop; and if the load did drop to any extent, the force which would be built up due to the dropping action might be so great as to break the drive means of the rotary machine; and this might possibly result in the drum getting entirely out of control and the load supported by the traveling block dropping to the lower end of the well. This obviously would result in considerable damage and possibly the loss of the entire well. At the time the driving power is applied to the drum, which is just prior to the releasing of the brakes, there is a considerable force or "kick" which is transferred through the brake drum to the brake mechanism which is commonly referred to in the oil producing industry as a "kick-back". In my invention the parts are so designed that this kick-back is absorbed by the brake construction itself and is not transferred to the driller through the manually operable brake lever.

Another feature of my invention resides in the provision of a braking construction in which the brake band unit is composed of a self-energizing part and a non-energizing part. The brake constructions ordinarily employed in the oil producing industry are of the self-energizing type. By "self-energizing" it is meant that the brake band is connected to a support at one end and is wrapped around the brake band, being attached at its other end to an operating means. The drum is rotated in a direction from the supported end of the brake band to the operated end of the brake band. If the pressure of the brake band at the actuated end is one hundred pounds, the pressure at the supported end would be increased to many times this value. In a band of such type which extends about three-quarters around a drum, the band pressure would be increased from one hundred pounds to approximately three hundred pounds. In my invention, as mentioned, I provide a brake unit in which one portion thereof is self-energizing, while the other portion thereof is non-energizing. In the preferred form of my invention these two parts of the brake unit are pivotally connected together and are capable of moving independently from engaged to released position.

A further feature of my present invention resides in the provision of a means whereby the brake band assembly is moved into a released or non-engaging position when there is no braking force applied thereto through the operating mechanism. In the preferred form of my invention, which utilizes a self-energizing portion and a non-energizing portion, my invention provides means whereby these two portions are separately moved into non-engaging or released position.

A still further feature incorporated in my invention resides in a means whereby the wear on the pivoted ends of the self-energizing portion and non-energizing portion of the brake unit may be controlled in such a manner that wear will take place thereon at a substantially equal rate of speed. As pointed out heretofore, the pressure at the supported end of the self-energizing part of a band is many times greater than the pressure at the actuated end. With respect to the non-energizing band, the pressure at the supported end is less than the pressure at the actuated end. It will therefore be seen that the supported ends of the self-energizing part and the non-energizing part of the brake unit will engage the brake drum with different pressures, the end of the self-energizing part engaging the drum with a much greater pressure than the end of the non-energizing part. It will therefore be seen that unless some compensation is made for this difference in pressure, the supported end of the self-energizing band will wear at a much higher rate of speed than will the supported end of the non-energizing band. My invention incorporates a means whereby the braking force of the brake construction on the drum may be utilized to equalize the pressures of the supported ends of the self-energizing part and the non-energizing part in order that the wear on these two supported ends will be as nearly equal as possible. This feature is of considerable importance due to the fact that by distributing the wear on the ends of these two parts of the brake unit, replacement of the brake linings will not be required as often as would be required if a large portion of the wear occurred on the supported end of the self-energizing part.

A further feature of my invention resides in a means whereby the entire brake unit is moved into a disengaged position when the brake is released. In the preferred form of my invention this clearance-providing means operates to move the pivoted ends of the two parts of the brake unit away from the brake band so that there will be a clearance at this particular point. My invention also incorporates means whereby the upper portion of the brake unit will be swung away from the drum and whereby the lower portion of the brake unit will be swung or may swing away from the drum.

One of the features of my present invention resides in a means whereby the lower brake band, when it moves into released position, will engage a properly positioned rest, which will cause the lower part of the brake unit to spread from its normal curved position into a non-circular position so that the two ends of this lower part may move outwardly so as to freely clear the brake drum.

It is a still further feature of my present invention to provide a braking construction in which the brake drum may occupy different positions relative to the braking construction without rendering the braking construction inoperative or without impairing the operation thereof to any appreciable extent. This is quite a valuable feature in view of the fact that it permits the braking construction of my invention to be used on different draw-works where the position of the drum may vary somewhat.

In my invention I prefer to provide a plurality of brake units which are associated together by a brake-operating mechanism which incorporates therein certain equalizing features whereby each brake unit will be applied at the same time and will apply the same braking force to the brake drum. In the preferred form of my invention I provide four separate brake units, each of which is operated by a single brake lever.

A further feature of my invention is that the brake units of the brake-operating mechanism may be quickly applied and released in order to give better control of the drum on which the braking mechanism of my invention has been installed.

A still further feature of my invention resides in the brake-operating mechanism and consists in the construction whereby the braking power applied through the control lever increases as the brake units are applied and decreases as the brake units are released.

In the numerous types of draw-works with which I am familiar, the brakes are so arranged that when the brakes are applied, there is an upward pull exerted on the floor of the derrick. This is caused by reason of the fact that the supported end of the brake band is connected to the floor of the derrick in such a manner that when the brake is applied, an upward pull is exerted on the derrick floor. When very heavy loads are being handled by the draw-works and great braking forces are required, the floor of the derrick will be sprung upwardly, and after this upward spring occurs, it is necessary for the driller to provide additional braking force through the lever which he is operating. In observing these types of braking constructions I have seen instances wherein the floor of the derrick has been sprung upward more than one inch. This is highly undesirable due to the fact that it renders the braking construction unreliable, and it is particularly undesirable due to the fact that the driller ordinarily gauges the braking force by the position which is occupied by the brake lever. It will therefore be seen that when a great force is applied to the brake drum through the braking mechanism, and when the floor of the derrick springs upwardly, the brake lever must be moved a greater distance, and this will throw off the calculations of the driller and will prevent him from controlling the draw-works with the same degree of accuracy with which the draw-works could be controlled if there were no springing action in the floor of the derrick and if the braking means were not permitted to change in position as I have pointed out.

In the preferred form of my invention the pressure of the braking load is against the floor of the derrick so that all of the parts are placed under compression. In view of the fact that the derrick base is set on a firm foundation and in view of the fact that the derrick base is made of a material having high compressive resistance, the braking mechanism of my invention will not change in position because no springing action will occur in the floor of the derrick. In my invention, therefore, the position of the brake lever for a given braking force will remain the same regardless of whether a great load is being carried by the draw-works or a small load is being carried thereby.

There are numerous advantages which accrue by reason of the unique features of construction of the preferred form of my invention. These advantages are too numerous to enumerate in the statement of invention, but they will be emphasized during the course of the following detailed description of my invention.

My invention provides many features which are capable of independent use, even though such features may be included in a single preferred form of my invention. In this application I desire to obtain patent protection on the whole of my invention and also on its separate parts and sub-combinations.

I shall now describe details of construction of the preferred form of my invention, and during the course of this description I shall refer to the accompanying drawings.

Referring to the accompanying drawings,

Fig. 3 is a sectional view taken on the line 3—3 of Fig. 1, this view showing the details of construction of one of the brake units which composes a part of the braking construction of my invention. Fig. 3 shows the brake unit with the brake band or bands in engaged position.

Fig. 6 is a sectional view taken on the line 6—6 of Fig. 3.

Fig. 7 is a sectional view taken on the line 7—7 of Fig. 3.

Fig. 9 is a sectional view illustrating a brake unit which utilizes the important features of my invention, but which employs slightly different details of construction. Fig. 9 illustrates the brake unit with the parts in engaged position.

I shall now describe the details of construction of my invention shown in Figs. 1 to 8 inclusive.

Figure 1:
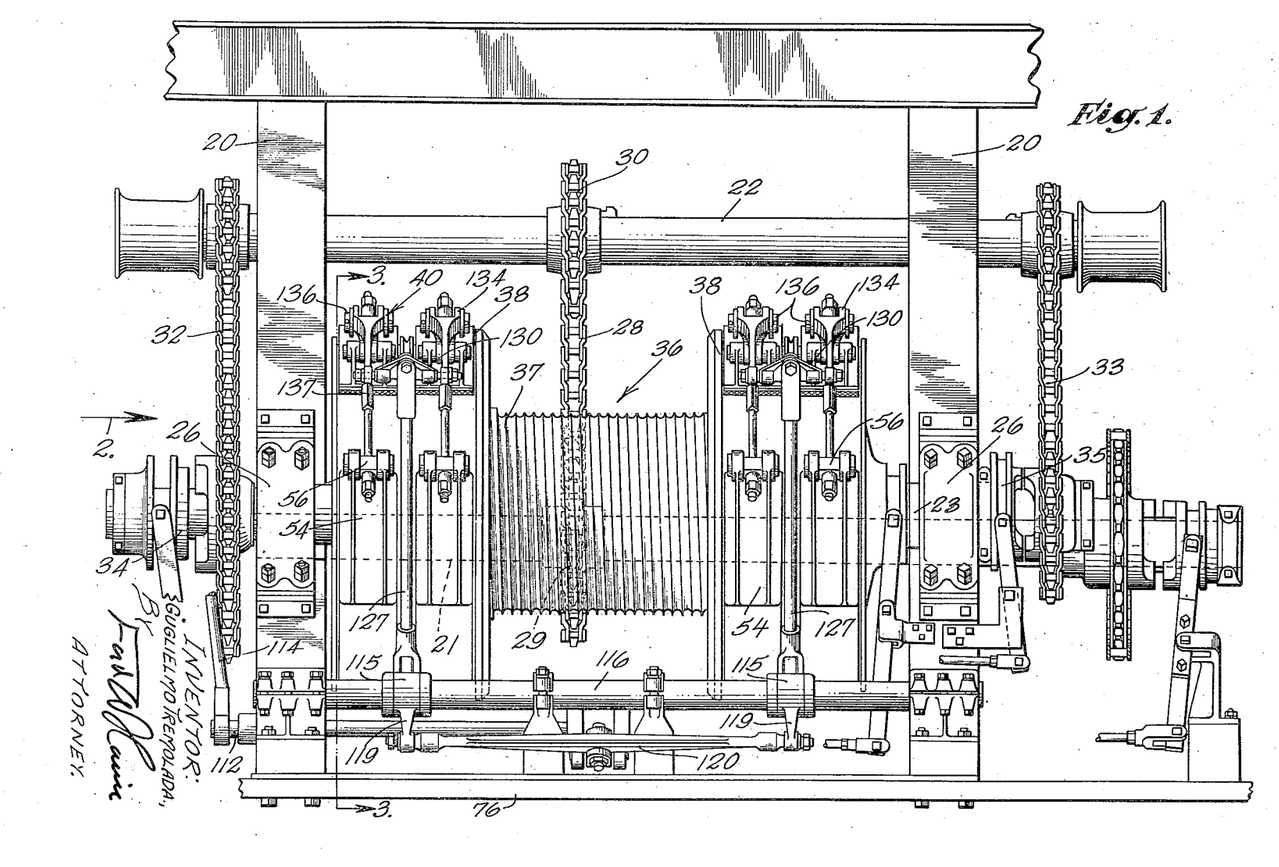
Fig. 1 is an elevational view of a draw-works incorporating the features of my invention.
Figure 2:
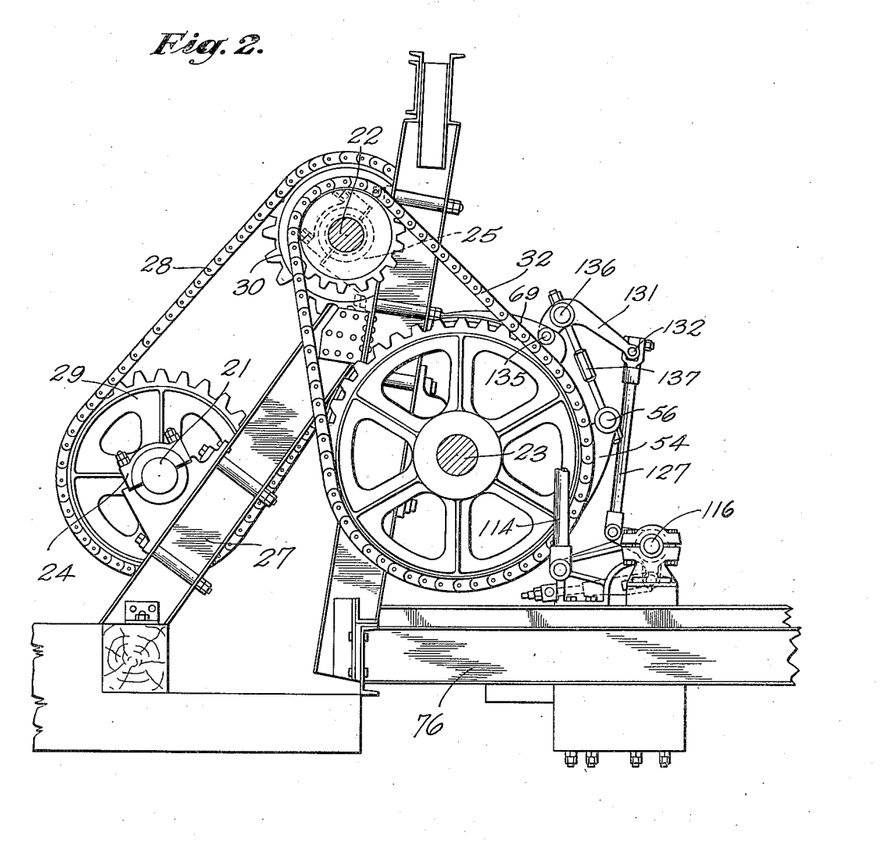
Fig. 2 is an end elevational view of the draw-works shown in Fig. 1, this view being taken as indicated by the arrow 2 of Fig. 1.

Referring to Figs. 1 and 2 in particular, the draw-works in which my invention is incorporated includes a plurality of uprights or post constructions 20 which rotatably support a drive shaft 21, a line shaft 22, and a drum shaft 23 by suitable bearings 24, 25, and 26 respectively. The drive shaft 21 and bearings 24 are supported on lateral bracing members 27 which may be considered as composing a part of the post constructions 20. The drive shaft 21 is adapted to be driven from a suitable prime mover and is adapted to drive the lineshaft 22 by means of a chain and sprocket arrangement including a chain 28 and sprockets 29 and 30 which are secured to the drive shaft 21 and the line shaft 22 respectively. The ends of the drum shaft 23 project beyond the posts 20 and are provided with chain and sprocket drive means whereby the line shaft 22 may be caused to drive the drum shaft 23. At the leftward end of the draw-works there is a primary chain and sprocket drive means 32, and at the rightward end of the draw-works there is a secondary chain and sprocket drive means 33, each of which includes chains which extend over sprockets connected to the line shaft and to the drum shaft. In order that either of the chain and sprocket drive means may be selectively employed to drive the drum shaft, there is provided a clutch 34 at one end of the draw-works and a clutch 35 at the opposite end of the draw-works, either of which clutches may be actuated so that either of the chain and sprocket drive means may be brought into operation.

Secured to the drum shaft 23 is a drum 36 having a central spooling portion 37 on which a cable may be wound. Mounted on the drum 36 adjacent the spooling portion 37 are brake drum portions 38 which are adapted to accommodate brake units which, when properly operated, will apply braking forces to the drum 36.

In the preferred form of my invention I provide four brake units 40, two of which are mounted on the brake drum constructions 38 on opposite sides of the spooling portion 37 of the drum 36. Each unit 40 of itself constitutes a complete braking mechanism which, when associated with a suitable brake-operating means, will be caused to function to apply a braking force to the brake drum. It will therefore be seen that my invention is not limited to any certain number of brake units 40 but may use one or more as desired. In the preferred form of my invention, however, I utilize four brake units as shown, each of which is operated by a brake-operating mechanism which will be described hereinafter and which is so designed and constructed that each of the brake units will apply a braking force which is equalized with respect to the braking forces applied by each of the other braking units.

I shall now refer particularly to Figs. 3 to 7 inclusive and explain the details of construction of one of the brake units 40 which comprises a part of my invention. The brake unit 40 is preferably designed to include a brake band having two brake parts 42 and 43. The brake part 42 is preferably a self-energizing part, and the other brake part 43 is preferably a non-energizing part. The self-energizing part 42 and the non-energizing part 43 may be made in two separate parts, as shown, or they may be made in a single construction. The self-energizing part 42 includes a flexible band member 44 within which there is supported a flexible brake lining 45. The brake band member 44 and the brake lining 45 are flexible to approximately the same extent that the ordinary self-energizing brake construction is flexible. The self-energizing part 42 extends slightly more than half way around the brake drum 38. Secured to the supported or pivoted end 46 of the self-energizing part 42 is a casting 47 which provides a pair of horizontally aligned bearings 48 adapted to receive a pivot bolt or shaft 49. This pivot bolt or shaft 49 extends through a boss 51 formed at the upper end of a supporting arm 52, and its center rests on a horizontal line A—A which extends through the axis of rotation of the drum. The self-energizing band 42 is therefore supported at the upper end of the supporting arm 52. The operated end 53 of the self-energizing band 42 is provided with a casting 54 providing a pair of spaced bosses 55 in which a yoke 56 is rotatably supported. The yoke 56 constitutes a means whereby the operated end of the self-energizing band 42 may be connected to the operating mechanism. This manner of connection will be pointed out when the construction of the operating means is described.

The non-energizing part 43 includes a band member 60 within which there is supported a brake lining 61. The band member 60 is more rigid than the band member 44 of the self-energizing part 42 and has a greater capacity for withstanding compressive forces. The brake lining 61 is heavier and is more rigid than the brake lining 45 and is able to withstand greater compressive forces than can be withstood by the brake lining 45. The supported or pivoted end 62 of the non-energizing part 43 has a casting 63 secured thereto, by means of which the non-energizing part 43 is pivotally supported. As shown best in Fig. 5, the casting 63 has a central boss 64 which is adapted to extend between a pair of bosses 65 which are provided by the casting 47 and which are supported by short arms 66 above the bearings 48. Extended through the central boss 64 of the casting 63 and the two bosses 65 of the casting 47 is a pivot bolt 68 by means of which the non-energizing part is pivotally connected to the self-energizing part 42 of the brake unit. Any other type of pivotal connection might be provided, such, for example, as a flexible member secured to the parts 42 and 43. The operated end 68a of the non-energizing part 43 has a casting 69 secured thereto, which casting provides a pair of bosses 70 which receive a pivot rod 71 whereby the casting 69 may be connected to the brake operating mechanism, as will be pointed out hereinafter.

With respect to the pivotal supporting of the self-energizing part 42 and the non-energizing part 43, I wish to emphasize that in the preferred form of my invention these two parts are not pivoted at the same point at which the brake band assembly is pivoted on the support arm 52. This is an important part of the invention and constitutes the means whereby the wear on the supported or pivoted ends of the two parts of the brake unit may be distributed so that the wear will not be imposed on the supported end of the self-energizing part 42. The manner in which this function occurs will be fully pointed out when the operation of the invention is described. It is also pointed out that the center of the pivot pin 68 is vertically disaligned from the center of the pivot pin 49, the center of the pivot pin 68 being farther away from the drum than the center of the pivot pin 49. The purpose of this arrangement is to eliminate chatter in the parts.

Figures 3, 6, 7:
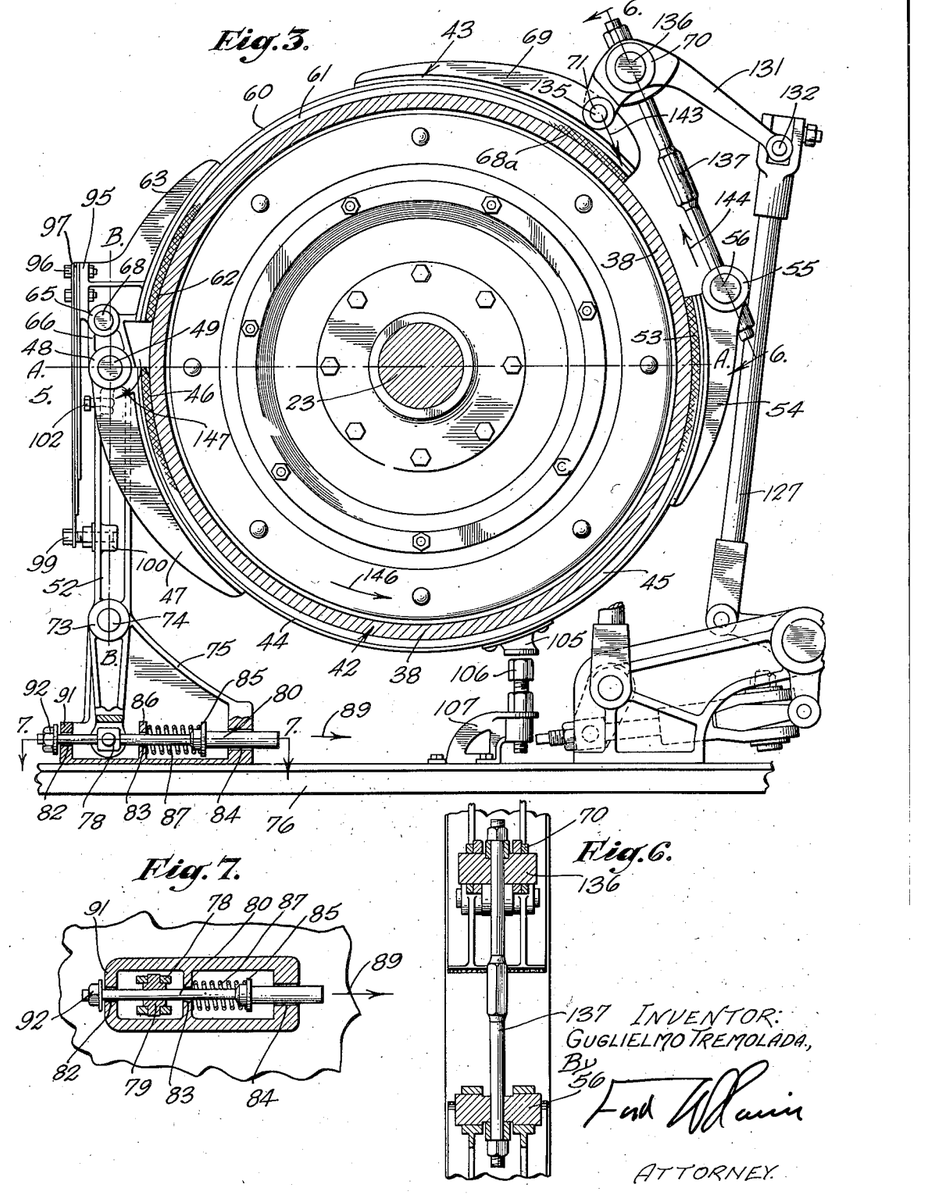

Reverting now to the support arm 52, the lower part of this arm is provided with a bearing portion 73 through which a shaft 74 is extended. The shaft 74 is in turn supported by a supporting structure or casting 75 which rests on a supporting base or floor of the derrick 76. It will be noted that when the brake is applied as shown in Fig. 3, the centers of the pivot pin 49 and the shaft 74 are both located on a vertical axis B—B which is at right angles to the line A—A. It is quite important, although not indispensable to the invention to have the two pivot points located on a vertical axis such as B—B when the parts of the brake unit are applied.

The support arm 52 projects below the bearing 73, and the lower end thereof includes a clevis 78 which rotatably supports a threaded block 79. This threaded block 79 is threadedly secured on a shaft 80 which is horizontally supported by the casting 75, as shown in Fig. 3; and is supported in horizontally aligned openings 82, 83, and 84. The shaft 80 has a shoulder 85, and compressed between this shoulder 85 and a wall 86 of the casting 75 in which the opening 83 is formed is a compression spring 87 which exerts a force on the shaft 80 which at all times tends to move same in a direction indicated by the arrow 89 of Figs. 3, 4, and 7. Threadedly secured on the left end of the shaft 80 which projects through a wall 91 of the casting 75, in which wall the opening 82 is provided, is an adjustable stop means in the form of a nut 92. This nut 92 may move into engagement with the wall 91 and in this manner will limit the movement of the shaft 80 in the direction of the arrow 89. The purpose of this arrangement just described is to resiliently exert a force which tends to rotate the support arm 52 in an anti-clockwise direction and to move the pivoted ends of the parts 42 and 43 of the brake unit in a leftward direction away from the drum 38 when the brake is released. In other words, the mechanism just described tends to swing the support arm 52 from the position shown in Fig. 3 into the position shown in Fig. 4 when the brake unit is released, and tends to resist the movement of this arm 52 from the position shown in Fig. 4 to the position shown in Fig. 3.

Figures 4, 5:
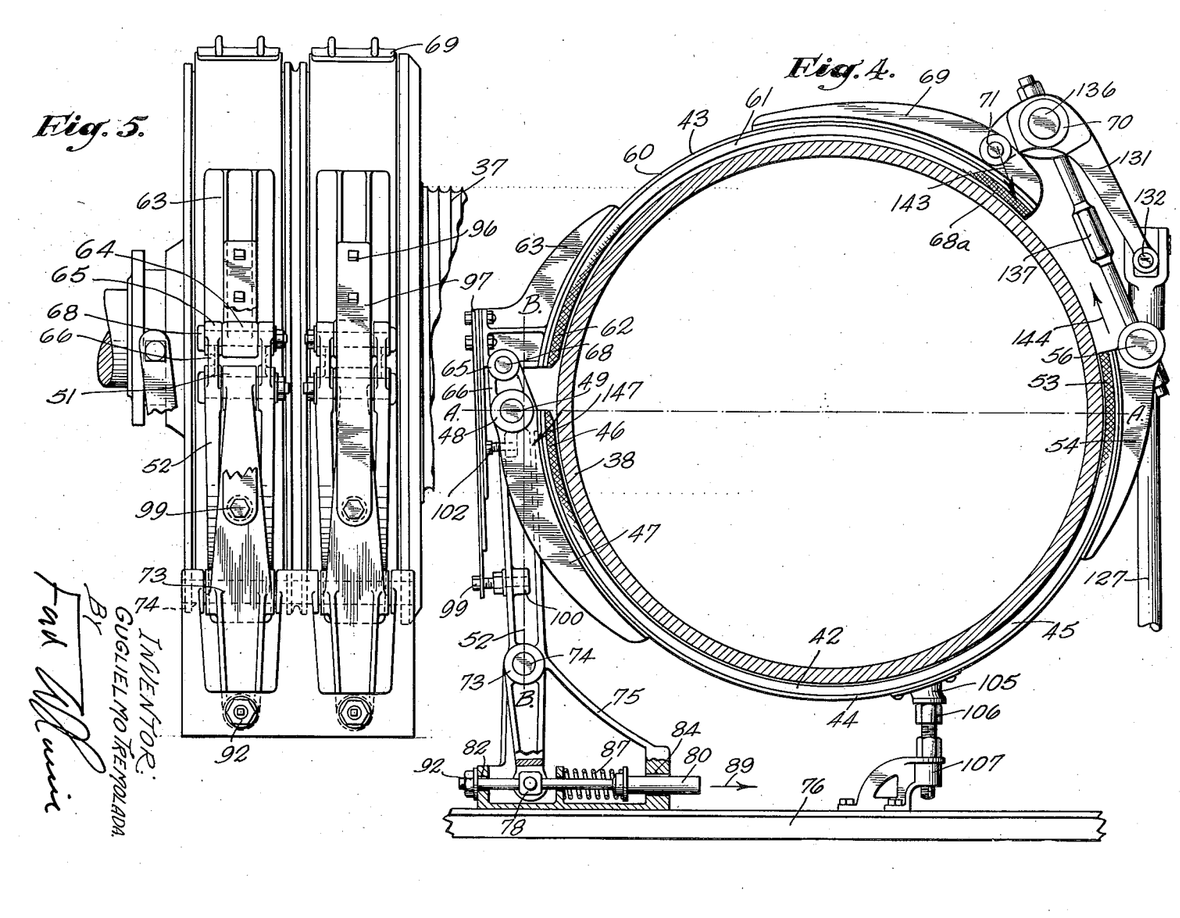
Fig. 4 is a view similar to Fig. 3 but showing the brake unit with the band or bands in released or disengaged position.
Fig. 5 is a view taken as indicated by the arrow 5 of Fig. 3, this view showing the construction which is provided at the pivoted or supported ends of the self-energizing and non-energizing parts which comprise the brake unit of my invention.

The casting 63 is provided with a vertical wall 95 which is to the left of the boss 64. Adapted to be secured to this wall 95 by suitable bolts 96 is a spring means 97 which may, as shown, consist of a plurality of leaves each of which cooperates to provide the spring means. The lower end of the spring means 97 is connected to the lever 52 by means of an adjustable connecting means which includes a bolt or machine screw 99 which is threadedly secured in a lug portion 100 of the support arm 52. The normal position of the spring means 97 is a curved position in which the lower end, if unrestrained, would in Fig. 3 occupy a position to the left of the position in which it is shown. The engaging means 99, however, engages the lower end of the spring means 97 and places it under a tension. There is always a tendency for the spring means to return to its normal position, and since the engaging means 99 is fixed with respect to the support arm 52, there can be no movement of the lower end of the spring means relative to the support arm 52. In view of the fact that the non-energizing part 43 of the brake unit is pivoted on the pivot bolt 68, there is a tendency for the non-energizing part 43 to be rotated in an anti-clockwise direction on the pivot bolt 68 by the spring 97. This spring 97 therefore constitutes a means whereby the non-energizing part 43 is rotated on the pivot bolt 68 so that this part is swung into a disengaged or released position as shown in Fig. 4 when the brake-operating mechanism permits this operation to take place. In order to prevent the spring means from producing too great a pivotal movement of the non-energizing part 43 on the pivot bolt 68, an adjustable stop means 102 is provided at the upper end of the support arm 52.

Secured to the self-energizing part 42 is a block 105 which is engageable with a rest 106 when the brake unit is in released position. This rest 106 is adjustably supported in a supporting bracket 107 which is secured to the floor 76 of the derrick. When the brake unit is in released position, the weight of the self-energizing part 42 is almost fully supported by the rest 106. Since the part 42 is of a flexible nature, there is a tendency for the operated end 53 of the part 42 to swing downwardly and outwardly with respect to the drum 38. This action will occur due to the fact that the supported end of the part 42 is pivotally connected to the supporting arm 52 and due to the fact that the central part of the part 42 below the drum 38 moves into a position to be supported by the rest 106. This outward and downward swinging movement of the actuated end of the self-energizing part 42 is essential in order that this operated end will be moved away from the drum 38 so that no engagement will take place when the support arm 52 is moved in an anti-clockwise direction and is moved from the position shown in Fig. 3 into the position shown in Fig. 4.

I shall now describe the brake actuating mechanism of my invention and the manner in which the brake units are connected thereto.

Secured to the floor 76 of the derrick in front of the draw-works is a pair of supporting brackets 110 having bearings 111 which are aligned with each other and which rotatably support a primary shaft 112. Secured to the extending end of the primary shaft is a manually engageable brake lever 114 which is manually operable for rotating the primary shaft 112. The brackets 110 have bearings 115 which support a shaft 116. Carried by this shaft 116 is a pair of bell cranks 117, these bell cranks being pivotally supported by the shaft 116. The bell cranks 117 have inwardly extending arms 118 and downwardly extending arms 119. Connected to each of the downwardly extending arms 119 is a balance bar 120. Connected to the central part of the balance bar 120 is a clevis 122 which is secured to the end of a connecting rod 123. The opposite end of the connecting rod 123 is connected to a clevis 124 which is formed on the end of a lever 125 which is secured to the primary shaft 112.

Connected to the inwardly extending arms 118 of the bell cranks 117 are vertical push rods 127 which have clevises 128 formed at their upper ends. Supported in a pivotal fashion in these clevises 128 are secondary balance bars 130.

Each brake unit is provided with a brake lever 131 which is pivotally connected to a balance bar 130 at 132. The end of the lever 131 opposite from the end which is pivotally connected to the secondary balance bars 130 is bifurcated so as to provide a pair of arms 134. The ends of these arms 134 are pivotally engaged with a pin 135 which is supported by the bosses 71 of the casting 69 of each brake unit. The central part of the bifurcated portion of each lever 131 rotatably supports a yoke 136. The yoke 136 is connected to the yoke 56 associated with the casting 54 by means of an adjustable rod 137.

Figure 8:
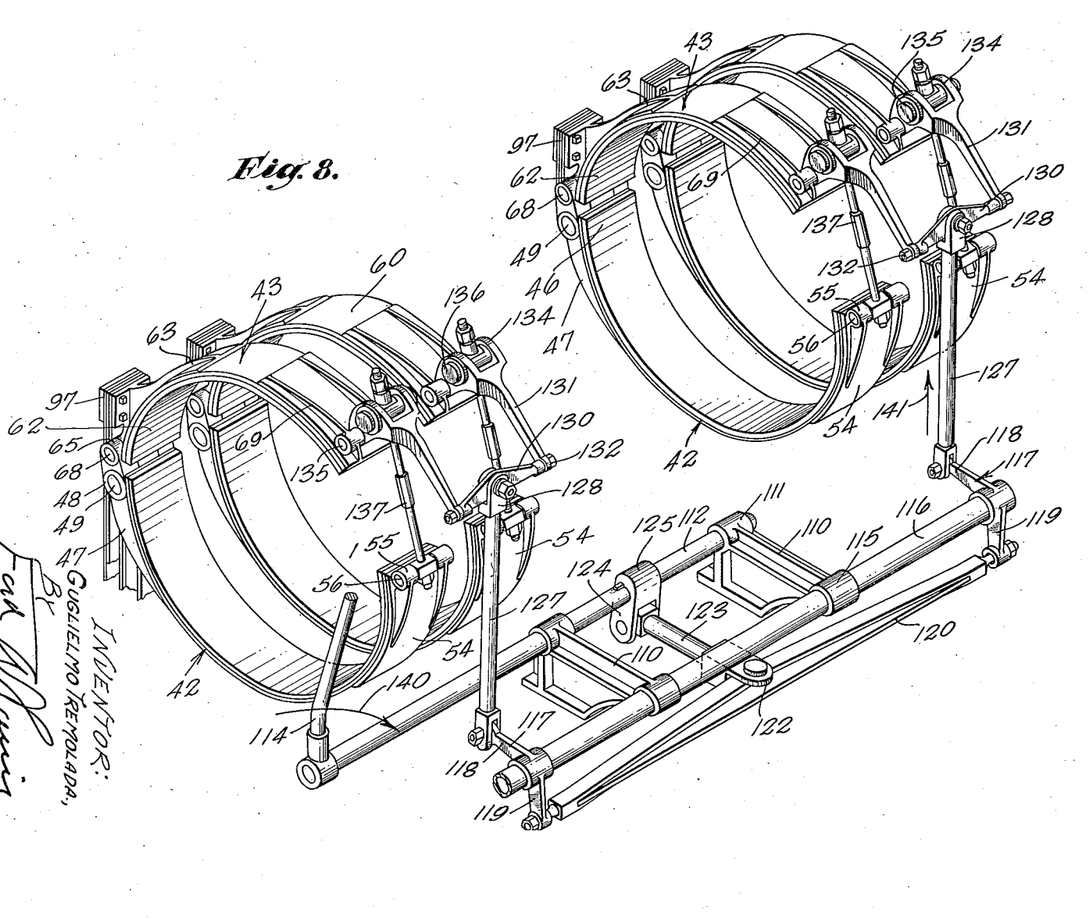
Fig. 8 is a perspective view showing the preferred form of my invention which incorporates four brake units of my invention which are operated in unison by the brake-operating mechanism which likewise constitutes a part of my invention.

If Fig. 8 will be inspected, it will be noted that the force applied to the brake lever 114 is transferred to the balance bar 120 by means of the interconnecting parts. This balance bar 120 divides the force equally between the bell cranks 117. The force applied to the bell cranks 117 is transmitted to the secondary balance bars 130. The secondary balance bars 130 divide the force applied thereto equally between the brake levers 131. This system therefore divides the braking force applied manually to the brake lever 114 into four equal parts so that the force applied to each of the brake units 40 is equal. Furthermore, the brake-operating mechanism just described applies not only an equal force to each of the brake units, but also applies an equal movement to the parts of each brake unit.

Having described the construction of the preferred form of my invention, I shall now describe its operation.

When it is desired to apply the braking mechanism so as to exert a braking force on the brake drums 38 of the drum 36, the operator will manually or otherwise engage the brake lever 114 and swing same in a direction indicated by the arrow 140 of Fig. 8. This movement of the brake lever 114 causes the interconnecting parts to operate as previously mentioned so that the push rods 127 are moved upwardly as indicated by the arrow 141 of Fig. 8. This motion is transmitted through the secondary balance bars 130 to the brake levers 131. The brake levers 131, due to the manner in which they are attached to the brake units 40, function in such a manner as to force downwardly on the operated end of the part 43, as indicated by the arrow 143 of Figs. 3 and 4, and to exert an upward force on the operated end of the part 42 through the medium of the adjustable rod 137, as indicated by the arrow 144. This operation of the operating mechanism produces the same action in each of the brake units, and this action will now be explained.

Prior to the actuation of the brake-operating mechanism as just described, the parts occupy the positions as shown in Fig. 4. At this time the support arm 52 is not aligned parallel to the vertical axis B—B but is retained in a slightly disaligned position due to the action of the spring 87 which resiliently retains the support arm in a position in which the supported ends 46 and 62 of the self-energizing part 42 and the non-energizing part 43 are spaced away from the brake drum 38. Also, the spring means 97 is in such a position that the non-energizing part 43 is supported in a raised position, and the operated end thereof is out of contact with the brake drum 38. At this time also the self-energizing part 42 is resting on the rest 106 and is distorted in shape so that the operated end 53 thereof is likewise out of engagement with the brake drum 38.

The first action which occurs when the brake-operating mechanism is operated, as previously mentioned, is the moving of the operated ends of the part 42 and the part 43 toward the brake drum. These operated ends are probably the first portions of the parts 42 and 43 to be brought into engagement with the brake drum 38. When this action has occurred, there is a tendency for the parts 42 and 43 to be pulled around the brake drum 38 with the result that the entire brake unit is brought into a position in which the parts 42 and 43 occupy positions concentric to the brake drum and occupy positions in which the entire braking surfaces of the two parts 42 and 43 contact the brake drum 38. In order that this may occur, it is necessary for the following actions to take place. In the first place, the support arm 52 is swung in a clockwise direction in order that the supported ends 46 and 62 of the self-energizing and non-energizing parts 42 and 43 of the brake unit may be brought into contact with the brake drum 38. This movement of the support arm 52 in a clockwise direction is counter to the action of the spring 87 which surrounds the shaft 80. A further action which occurs is the pivoting of the non-energizing part 43 on the pivot bolt 68 against the action of the spring means 97 so that this non-energizing part 43 is brought into full contact with the drum 38. A further action which occurs is the raising of the self-energizing part 42 from the position in which it is supported by the rest 106. When this self-energizing part 42 is raised from supported position, the part may return to normal position so that the inner surface of the brake lining 45 thereof will conform in shape to the shape of the brake drum.

When the self-energizing and non-energizing parts 42 and 43 are moved into braking positions, as shown in Fig. 3, the braking forces effective at that time may be explained as follows. In explaining these braking forces it should be understood that the values which are used are merely arbitrary and are intended only to be illustrative of the action which occurs. Let us assume that when the brake unit is applied, there is a braking pressure of one hundred pounds applied to the operated ends of the self-energizing and non-energizing parts 42 and 43 respectively. The braking pressure at the supported end 46 of the self-energizing part 42 will be approximately three hundred pounds. This increase in braking pressure is due to the characteristics of the self-energizing type of brake band and is due to the fact that the band is of a flexible nature and tends to wrap itself tightly around the brake drum. This furthermore occurs because the extension of the flexible brake band from the supported end to the operated end is in the direction of rotation of the drum. If the drum rotated in an opposite direction, the reactionary force applied by the drum against the brake band would tend to force the brake band away from the drum, and under such circumstances we would have a non-energizing type of band.

With respect to the non-energizing part 43, the braking pressure at the operated end is assumed to be one hundred pounds. The braking pressure at the supported end 62 of this non-energizing part 43 will only be fifty pounds. This is in accordance with the principle of operation of the non-energizing type of band, and this reduction in braking pressure at the supported end occurs by reason of the fact that the brake band in the first place is more rigid and primarily because the reactionary force of the brake drum against the brake band tends to force the brake band toward the supported end and tends to have the effect of forcing this supported end of the brake band away from the drum. It will be seen that the direction of the non-energizing part 43 from the supported end 62 thereof to the operated end is opposite to the direction of rotation of the brake drum 38. This is just the opposite from the self-energizing part 42.

When the brake unit is fully applied and the parts 42 and 43 thereof grip the brake drum 38, the rotative tendency of the brake drum tends to rotate the parts 42 and 43 with the brake drum 38 in the direction indicated by the arrow 146. This rotative force applied to the parts 42 and 43 is applied directly to the support arm 52 and is fully resisted thereby. When the brake unit is in engaged position, the support arm 52 is symmetric on the vertical axis B—B. Furthermore, the pivot bolt 49 is located with its axis on a horizontal axis A—A which extends horizontally through the axis of rotation of the drum 38 or through the axis of rotation of the drum shaft 23. The force applied by the parts 42 and 43 by reason of this arrangement will be in a downward vertical direction and will be applied on the line B—B. This is quite an important consideration because, by applying the force in a true vertical direction to the support arm 52, there will be no tendency for the support arm to be swung in either direction from true vertical position due to the fact that the force applied thereto is along the line B—B which extends through the center of the pivot bolt 49 and the shaft 74 on which the support arm 52 is supported.

It will be noted that the lines A—A and B—B are at right angles to each other. The force applied by the brake unit or brake band portion of the brake unit is applied at right angles to the line A—A and is applied parallel to the line B—B. In a device incorporating the feature of my invention now under consideration it is not necessary that the line A—A be horizontal and that the line B—B be vertical. All that is necessary is that the line A—A and the line B—B be at right angles to each other. Expressing this thought in a different manner, it is necessary that the axis of the pivot bolt 49 and the axis of the shaft 74 be on a line which coincides and is symmetric to the direction of the force which is applied to the lever 52 by the brake band including the parts 42 and 43 when the brake is applied.

After the brake has been applied and the motion of the drum has been arrested and it is desired to again rotatably drive the drum, it is necessary to apply a driving force to the drum prior to the releasing of the brakes so that there will be no opportunity for the load carried by the cable wound on the drum to fall. In order to accomplish this, it is necessary to release the brake as the driving force is applied to the drum, or to release the brake slightly after the driving force is applied. Since it is almost humanly impossible to release the brake simultaneously with the applying of the driving force, the brake is usually released a fraction of a second after the driving force is applied to the drum. The action which occurs at this time is that the drum is driven in the direction of the arrows 146 or in an opposite direction. Regardless of the direction in which the drum is driven, the force applied to the drum is transmitted to the brake band which includes the parts 42 and 43 due to the fact that these parts are in engagement with the brake drum 38. This force is suddenly applied and is quite powerful. In the construction of my invention this force is absorbed entirely by the support arm 52 which is connected to the brake band and is also connected to the floor of the derrick. None of this starting force or kick-back, as it is called, is delivered to the operating lever 114 and therefore the operator does not have to resist this force which would be great enough to break the operator's arm or do him other physical injury.

I shall next describe the manner in which the wear on the supported ends 46 and 62 of the parts 42 and 43 is balanced. Referring to Fig. 3 or 4, it will be noted that the supported end 46 of the self-energizing part 42 engages the brake drum 38 at a position eccentric to the axis of rotation of the self-energizing part 42 on the pivot bolt 49. Due to this eccentricity, the reactionary force of the brake drum against this supported end 46 of the part 42 produces a moment in the self-energizing part 42 around the pivot bolt 49 in a direction indicated by the arrow 147. It will be seen that if the self-energizing part 42 would move in the direction of the arrow 147, the bosses 65 which support the pivot pin 68 would move in a clockwise direction toward the brake drum 38. This would move the supported end 62 of the non-energizing part 43 inwardly toward the brake drum 38. By reason of this arrangement, therefore, the moment produced in the supported end 46 of the self-energizing part 42, which is in the direction indicated by the arrow 147, forces the supported end 62 of the non-energizing part 43 into greater pressural contact with the brake drum 38 than exists without this additional force, with the result that there will be more nearly an equalization of wear on the ends of the brake linings at the supported ends 46 and 62 of the parts 42 and 43.

A further feature in the construction is the arrangement of the center of the pivot bolt 68 to the left of the axis B—B so that the force applied through these parts will not cause chatter. If the parts were so located that the force applied by the non-energizing part 43 were substantially on the axis B—B, this force would tend to cause a chattering action which is, however, eliminated by the arrangement of the pivot bolt 68 as disclosed in the drawings.

A further feature of my invention is that the brake construction is operative even though the center of the drum 36 were raised or lowered from the position shown in the drawings or moved leftward or rightward. This is due to the fact that there is a pivotal connection between the brake band and the support lever 52, and likewise a pivotal connection between the support lever and the floor of the derrick. When the drum 36 is raised or lowered or moved leftward or rightward, the support arm 52 and the associated parts merely assume different positions. However, the difference in position of the arm will not render the device inoperative or impair its operation to any appreciable extent. It is possible that a change in position of the drum 36 will disalign the support arm 52 from the axis B—B but this it is believed is the only feature which may be sacrificed even though the drum 36 is mis-positioned.

A further feature and advantage accruing from the invention is that the braking pressure which is transmitted through the braking apparatus through the floor of the derrick is transferred in a downward direction through the support arm 52. The parts are all under compression and there is no springing action such as occurs in the old type of brake constructions in which the braking force exerts a pull on the floor of the derrick.

I will now describe the second form of my invention which is disclosed in Figs. 9 to 12 inclusive. This second form of my invention provides a pair of brake units 160 which incorporate substantially the same valuable features as the brake unit 40 which forms a part of the form of my invention which has already been described. The details of construction, however, of the brake units 160 and 40 are somewhat different. In this second form of my invention I utilize but two brake units 160. It should be understood, however, that my invention is embodied in a single brake unit and in the operating mechanism for a pair of brake units. It should be kept in mind, however, that this second form of my invention may be incorporated in a braking construction including more than two brake units if desired.

Figure 9:
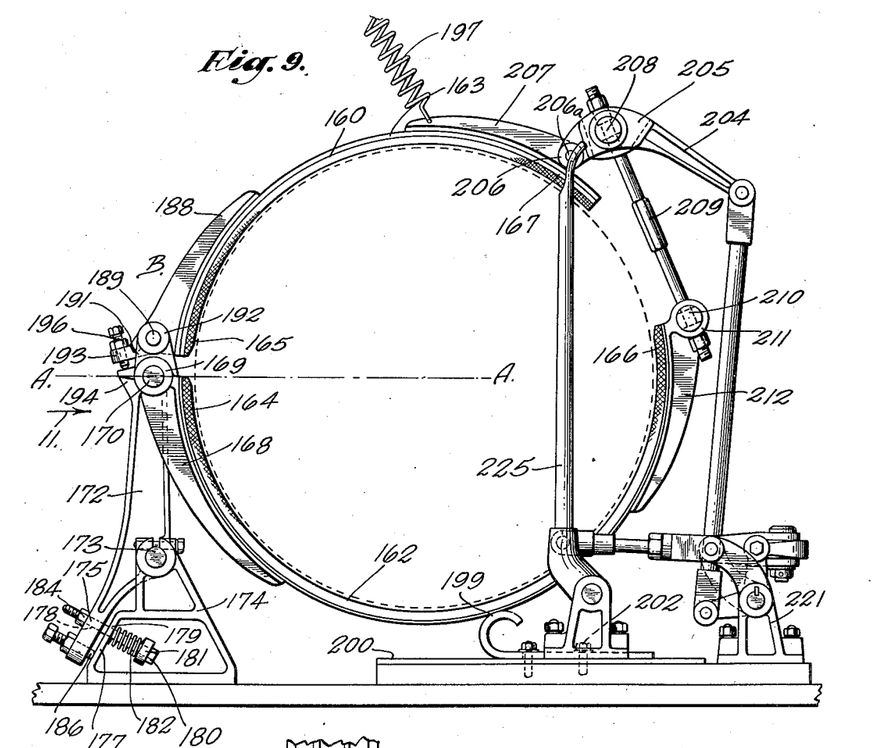

Referring now to the drawings, the brake unit 160 which constitutes a part of this second form of my invention has a brake band including a self-energizing part 162 and a non-energizing part 163. The self-energizing and non-energizing parts 162 and 163 include the same structural features and functional features as the parts 42 and 43 of the first form of my invention. I will therefore not describe the details of construction of these two parts 162 and 163 any further than to point out the differences in details. The parts 162 and 163 have supported parts or ends 164 and 165 respectively and likewise have operated ends 166 and 167 respectively. The supported end 164 is provided with a casting 168 which is provided with bearings or bosses 169 for supporting a pivot pin 170. This pivot pin 170 is extended through the upper end of a support arm 172 which resembles in structure and function the support arm 52. The support arm 172 is pivotally supported at 173 by a base casting 174. The centers of the pivot 173 and the pivot 170 are on a vertical line B—B when the brake is in applied position, as shown in Fig. 9. For the purpose of swinging or tending to swing the support arm 172 in a counter-clockwise direction in the same manner that the support arm 52 is swung or tended to be swung in a counter-clockwise direction, I provide in this second form of my invention an angular and downwardly extending arm 175 which extends adjacent a wall 177. Extending through an opening 178 in the arm 175 and through an opening 179 in the wall 177 is a shaft 180. On the lower end of the shaft 180 is an abutment 181 and compressed between the abutment 181 and the wall 177 is a compression spring 182. Threadedly secured on the end of the shaft 180 which extends upwardly from the arm 175 is an abutment nut 184 whereby the compression of the spring 182 may be controlled. Also associated with the arm 175 is an adjustable stop member 186 whereby the movement of the support lever 172 in an anti-clockwise direction may be controlled. It will be seen that the spring 182 is so arranged that it exerts a force tending to swing the support arm 172 in an anti-clockwise direction.

The non-energizing part 163 is provided with a casting 188 which supports a pivot bolt 189, which pivot bolt is carried by bosses 192 which bosses 192 are supported at the upper parts of webs 191 which compose a part of the casting 168. Extending outwardly from the casting 188 adjacent the pivot bolt 189 is an ear 193 which projects above a shoulder 194 formed in the upper end of the support arm 172. Carried by the ear 193 is an adjustable stop member 196 which is adapted for engagement with the shoulder 194 in order to control the outward pivoting movement between the parts 162 and 163. For the purpose of tending to move the part 163 into released position, I provide a spring 197 as disclosed in Figs. 9 and 10.

Figure 10:
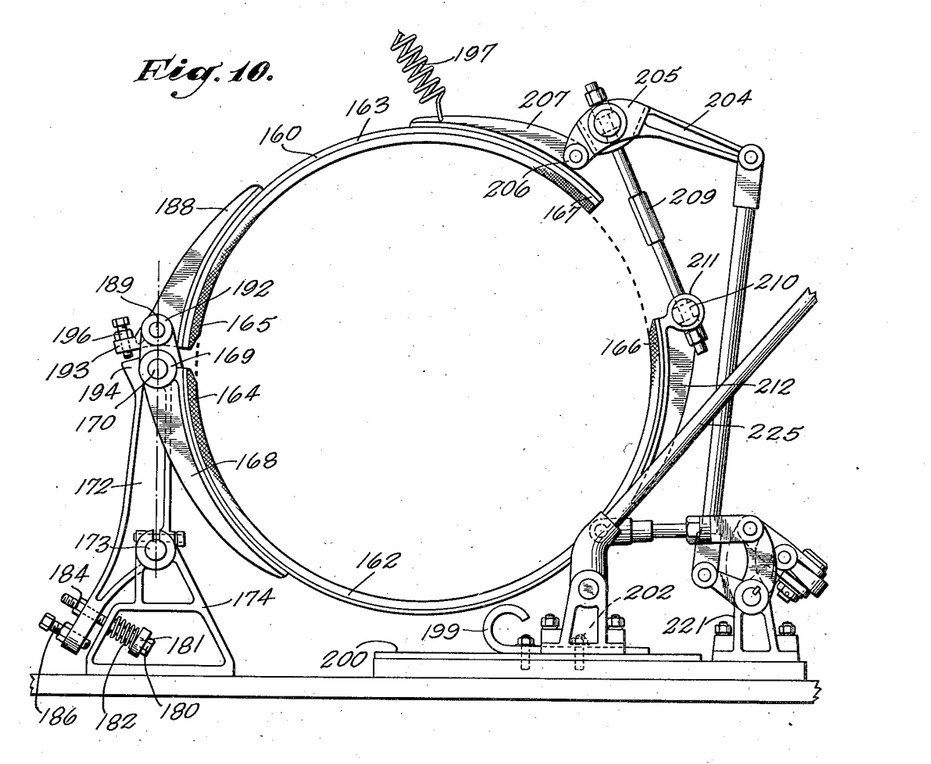
Fig. 10 is a view similar to Fig. 9, this view showing the parts of this form of brake unit in disengaged or released position.
Figure 11:
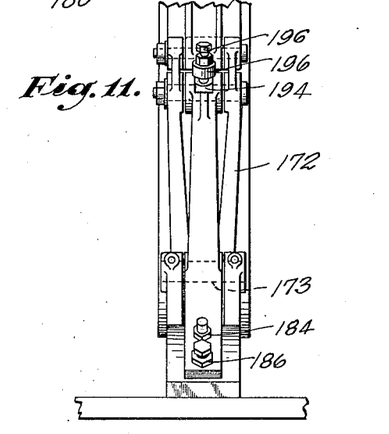
Fig. 11 is a view taken as indicated by the arrow 11 of Fig. 9.

In this form of my invention I provide a rest 199 which performs the same function as the rest 106 in the first form of my invention. This rest 199 is of a different form, however. It is slidably supported on a horizontal wall 200 and may be horizontally adjusted after loosening the securing bolts 202 to determine the resting position of the part 162. It will be seen that when the rest 199 is moved in a rightward direction as shown in Figs. 9 and 10, the resting position of the part 162 will be lowered.

The parts 162 and 163 are operated through a lever 204 having a bifurcated end 205, which bifurcated end 205 is pivoted at 206 to a casting 207 secured to the operated end 167 of the part 163. The bifurcated end 205 pivotally supports a yoke 208 through which an adjustable rod 209 is extended. The lower end of the adjustable rod 209 is supported by a yoke 210 which is pivotally supported by bosses 211 formed at the upper end of a casting 212 which is secured to the operated end 166 of the part 162. If this construction just described is compared to the construction which performs the same function in the first form of my invention, it will be seen that these constructions are practically identical.

I will now describe the operating mechanism for this form of my invention. This operating mechanism is somewhat different in detail from that disclosed in the first form of my invention and this operating mechanism incorporates certain important features of my invention.

Figure 12:
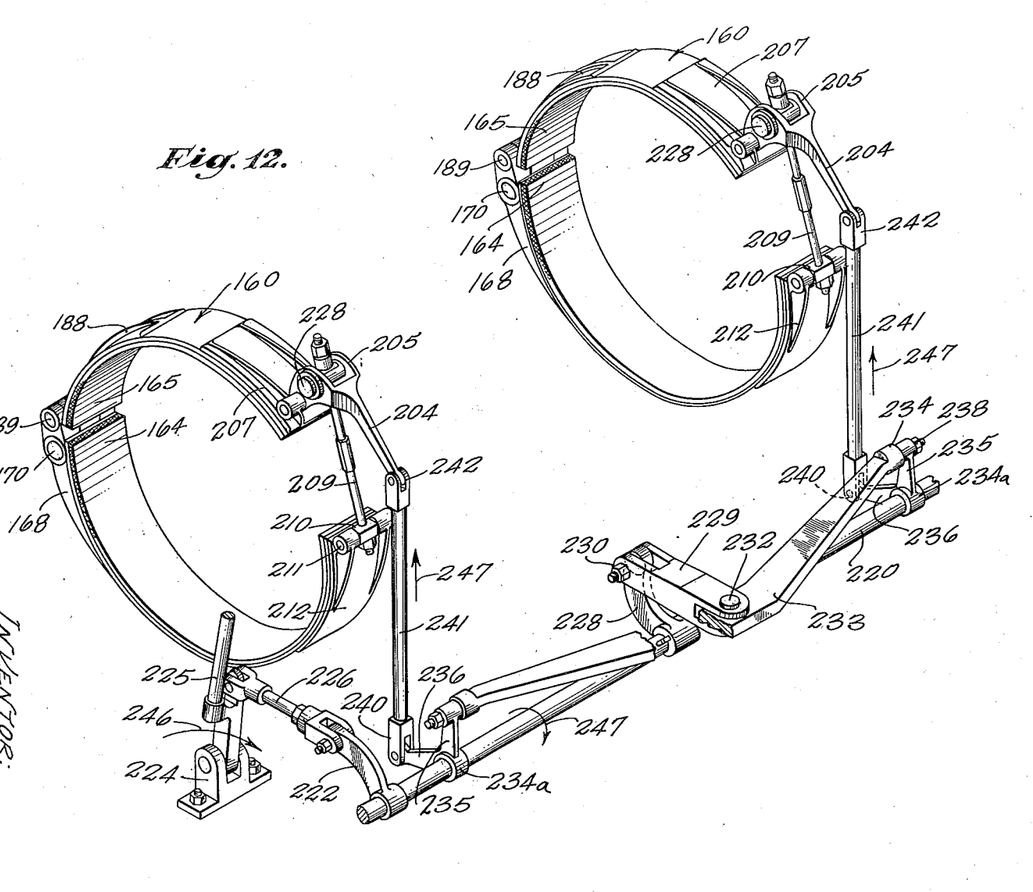
Fig. 12 is a perspective view showing the alternative form of my invention which includes but two brake units and includes an alternative type of brake-operating mechanism particularly adapted for the operation of two or more brake units. It should be understood, however, that this alternative form of my invention may employ a greater number of brake units than is disclosed without departing from the invention.

Referring particularly to Fig. 12, the operating mechanism has a rotatable shaft 220 which is supported by brackets 221. Secured to one end of this shaft 220 is a curved lever 222, which lever is curved in an upward direction as disclosed. Pivotally secured on a bracket 224 adjacent the shaft 220 is an operating lever 225 which is adapted to be manually operated and which is connected to the lever 222 by a linkage 226. Secured to the central portion of the shaft 220 is an inwardly and upwardly curved second lever 228 which has a clevis bar 229 connected to the upper end thereof on a horizontal pivot 230. The other end of this clevis bar 229 is connected by a vertical pivot 232 to the central part of a balance bar 233. The central part of the balance bar 233 is vertically disaligned with the shaft 220 but the ends 234 thereof are extended inwardly so that they are nearly above the shaft 220. Pivotally supported on the shaft 220 is a pair of bell cranks 234a having upwardly extending levers 235 and inwardly extending levers 236. The upwardly extending levers 235 are pivotally connected to the ends 234 of the balance bar 233 by horizontal pivots 238. The inwardly extending levers 236 are pivotally connected at 240 to the lower end of vertical push rods 241, which push rods 241 are connected to the levers 204 by pivots 242.

In this form of my invention the brake units 160 each operate substantially in accordance with the first described form of my invention and there is therefore no necessity of repeating a detailed description of the operation of this form of my invention. In view of the difference between the two operating mechanisms, however, I will describe the manner in which the operating mechanism of this second form of my invention operates.

When the lever 225 is moved in a direction indicated by the arrow 246, the shaft 220 is rotated in a direction indicated by the arrow 247. This causes the upper end of the second curved lever 228 to move in a rightward direction and causes the balance bar 233 to move in a rightward direction. Since the balance bar is pivotally connected at its exact center, the force applied thereto by the clevis bar 229 is equally divided between the ends thereof. When this action occurs the bell cranks 234a are moved in a clockwise direction and the push rods are pushed upwardly with equal forces in a direction indicated by the arrows 247. This causes the lever 204 to operate to force the operated end 167 and the operated end 166 toward the brake drum, thus applying the brake unit. Each brake unit is operated in this manner and is applied at the same time and with the same force due to the arrangement of the parts of the brake operating mechanism.

The two forms of my invention which I disclose in this patent application are the forms which I, at the present time, believe are most satisfactory. It may occur, however, that different structural details and different arrangements of parts may be necessary in order to obtain a more commercially satisfactory apparatus or may be required to suit the special needs of different draw-works constructions which now are or which may in the future be employed in the oil producing industry.

I believe that my invention provides a structure which incorporates certain principles which have never before been incorporated in a combination of the character of my invention nor utilized in the accomplishing of the results which accrue from my invention. I do not wish that my invention be limited to the details of construction of the parts which I now believe are the best constructions in which my invention may be incorporated, but wish my invention to be construed in a broad manner and to be construed as covering a certain combination which utilizes certain principles in a certain manner to produce the results specified.

Furthermore, I recognize that different portions of my invention are susceptible of independent use and may be applied to an ordinary brake construction and incorporate in such brake construction features which will make a better device. Although all of the parts of my invention cooperate to produce what I believe to be the most satisfactory brake construction, the different sub-combinations or details of construction which are susceptible of independent use may be independently used to produce a braking construction which will be highly satisfactory although it may not be as satisfactory as the brake construction incorporating all of the features of my invention.

As an example of the scope of my invention, I wish to point out that the combination of a self-energizing part and a non-energizing part of a brake band pivotally or otherwise connected together may be used independently of other features of my invention. If the support arm were eliminated and a rigid support provided, it will be seen that certain features of my invention would be eliminated.

As a further example, it is possible to utilize the wear equalizing feature of my invention independently of the characteristics of the support arm and independently of the combination of the self-energizing and non-energizing band.

As another example, it would be possible to utilize the brake operating mechanism of my invention with other types of brake units which do not incorporate the patentable features of my invention.

I have cited the above merely as examples and do not wish such a citation to be construed as meaning that other subcombinations are not possible.

In accordance with the above definition of my invention and its scope, I wish the invention to be construed in accordance with the appended claims considered in connection with the specification.

I claim as my invention:

1. In a brake construction including a brake drum, the combination of: a brake band having a non-energizing part, a relatively flexible self-energizing part, and connecting means for connecting said parts together; operating means for said brake band; and support means connected only to said self-energizing part.

2. In a brake construction including a brake drum, the combination of: a brake band having a non-energizing part, a relatively flexible self-energizing part, and connecting means for connecting said parts together; operating means for said brake band; and a single supporting means for preventing rotation of said brake band, said supporting means being pivotally connected to said self-energizing part near said connecting means.

3. In a brake construction including a brake drum, the combination of: a brake band having a non-energizing part, a self-energizing part, and connecting means for connecting said parts together; operating means for said brake band; and a swingable support arm pivotally connected to said self-energizing part near said connecting means and at a point nearer said brake drum than said connecting means.

4. In a brake construction of the class described, the combination of: a brake drum; a brake band operable thereon including a pair of band parts, and pivot means for pivotally connecting together said band parts; operating means for said brake band; and support means connected to only one of said band parts adjacent and offset from said pivot means in such a position relative to said pivot means that when said brake band is applied to said brake drum the force tending to rotate said brake band with said brake drum tends to force the adjacent end of the other of said band parts outwardly from said brake drum.

5. In a brake construction of the class described, the combination of: a brake drum; a brake band operable thereon including a pair of band parts, and pivot means for pivotally connecting together said band parts; operating means for said brake band; and support means connected to one of said band parts adjacent said pivot means and at a point nearer the surface of said brake drum than said pivot means.

6. In a brake construction of the class described, the combination with a brake drum: a brake band including a pair of brake parts, and a pivot means for pivotally connecting said brake parts together, said brake parts being adapted for engagement with said drum; operating means for said brake band; support means engaging said brake band adjacent said pivot means; and means engaged by one of said brake parts away from its ends for causing the free end of said last-named brake part to swing outward from said brake drum when said brake band is released.

7. In a brake construction of the class described, the combination with a brake drum: a brake band including a pair of brake parts, and a pivot means for pivotally connecting said brake parts together, said brake parts being adapted for engagement with said drum; operating means for said brake band; support means engaging said brake band adjacent said pivot means; and means in the form of a stop engaged by one of said brake parts away from its ends for causing the free end of said last-named brake part to swing outward from said brake drum when said brake band is released.

8. In a brake construction of the class described, the combination with a brake drum: a brake band including a pair of brake parts, and a pivot means for pivotally connecting said brake parts together, said brake parts being adapted for engagement with said drum; operating means for said brake band; support means engaging said brake band adjacent said pivot means; and means engaged by one of said brake parts away from its ends for flexing same at a point remote from the ends of same for causing the free end of said last-named brake part to swing outward from said brake drum when said brake band is released.

9. In a brake construction of the class described, the combination of: a brake drum; a brake band operable thereon having a relatively non-flexible band part connected together; supporting means engaging said brake band near the point of connection of said parts thereof and a relatively flexible band part; and operating means for said brake band.

10. In a brake construction of the class described, the combination of: a brake drum; a brake band operable thereon having a relatively non-flexible band part and a relatively flexible band part, said two parts substantially surrounding said drum, and pivot means for pivotally connecting together said band parts; and operating means for pulling the free ends of said band parts together.

11. In a brake construction of the class described, the combination of: a brake drum; a brake band operable thereon having a relatively non-flexible band part and a relatively flexible band part; flexing means engaging said relatively flexible band part when same is in disengaged position; and operating means for said brake band.

12. In a brake construction of the class described, the combination of: a brake drum; a brake band operable thereon having a relatively non-flexible band part and a relatively flexible band part, and pivot means for pivotally connecting together said band parts; flexing means engaging said relatively flexible band part when same is in disengaged position; and operating means for said brake band.

13. In a brake construction of the class described, the combination of: a brake drum; a brake band operable thereon and having a flexible portion, said brake band also having a free end; operating means for moving said brake band between engaged and disengaged positions; and flexing means engaging said brake band when same is in disengaged position for flexing same to swing the free end of said brake band away from said brake drum.

GUGLIELMO TREMOLADA.